No. 11,713. Reissued Jan. 31, 1899.

R. ASHLEY.

STORAGE BATTERY.

(Application filed Apr. 9, 1898

Witnesses

Marcus L. Byng

Arthur L. Bryant

Inventor

Ralph Ashley

J. V. Blair

Attorney

UNITED STATES PATENT OFFICE.

RALPH ASHLEY, OF PORT REPUBLIC, NEW JERSEY, ASSIGNOR, BY DIRECT AND MESNE ASSIGNMENTS, TO THE GUARANTOR ELECTRIC COMPANY, OF CAMDEN, NEW JERSEY.

STORAGE BATTERY.

SPECIFICATION forming part of Reissued Letters Patent No. 11,713, dated January 31, 1899.

Original No. 591,265, dated October 5, 1897. Application for reissue filed April 9, 1898. Serial No. 677,102.

*To all whom it may concern:*

Be it known that I, RALPH ASHLEY, a citizen of the United States, and a resident of Port Republic, in the county of Atlantic and State of New Jersey, have invented certain new and useful Improvements in High-Tension Batteries; and I do hereby declare that the following is a full, clear, and exact description of the invention, which will enable others skilled in the art to which it appertains to make and use the same, reference being had to the accompanying drawings, and to the figures of reference marked thereon, which form a part of this specification.

My invention relates to secondary or storage batteries; and its object is to provide a battery of this character which shall be cheap, simple, and economical in construction and which will develop an increased voltage or tension of electrical energy.

The invention consists, essentially, in a battery composed of a number of cups or trays, of rubber or other suitable insulating material, arranged in a vertical stack or pile, but out of contact with each other. The lower part of each cup or tray tapers toward the bottom, so that it will rest within the one next below it, and the bottom portion of each cup or tray, except the lowermost one, has secured to it a positive and negative plate, one being on the upper surface or inside of the tray and the other being on the lower surface or outside of the tray. The said lowermost tray has a plate on the upper or inside surface only and is seated in a lead tray which will catch any acid which may boil or bubble over in charging. Interposed between each of said positive and negative plates is a perforated wooden or other non-conducting plate and a sheet of asbestos. The positive and negative plates are connected together in series by conductors which run up on the inside of the tray and then down on the outside of the tray and are secured to said plates by soldering or otherwise. By increasing the number of cells or trays a corresponding increase of voltage will be produced for each cell so added, making a series battery of a potential only limited by the number of trays or cells.

The battery is inclosed within a suitable box or casing provided with a hinged door, by which access may be had thereto.

The invention thus briefly outlined will now be described in detail, referring to the accompanying drawings, in which—

Figure 1:
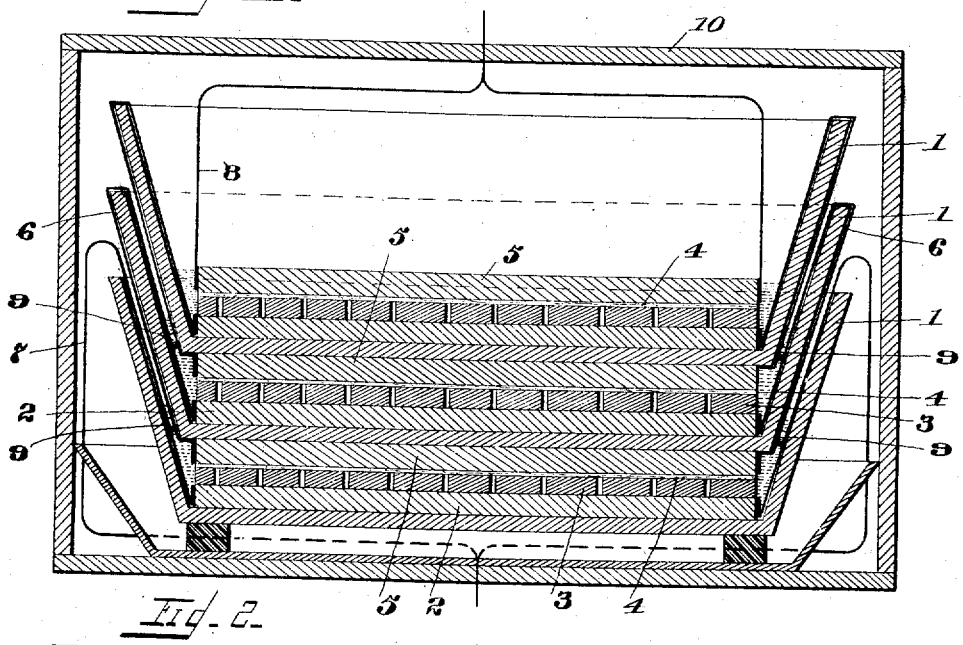
Figure 2:
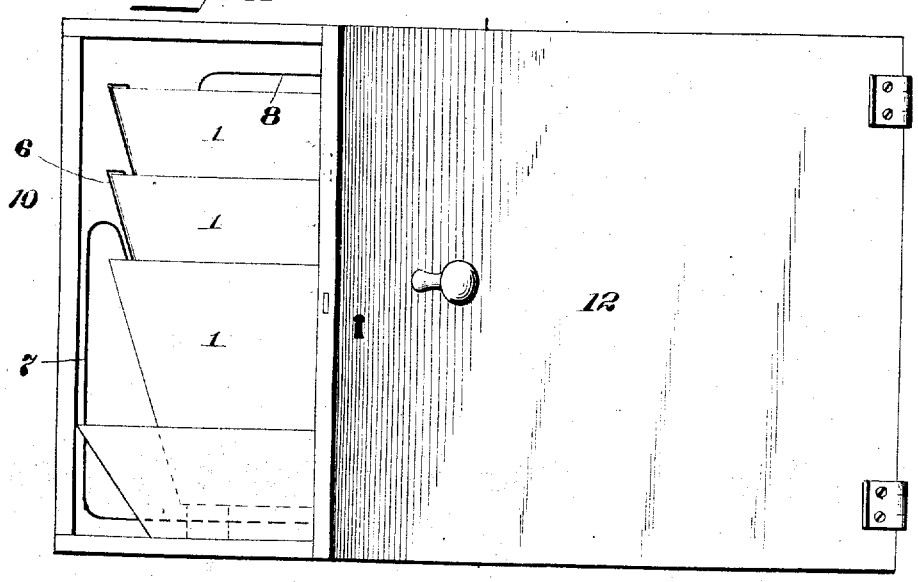

Figure 1 is a central longitudinal section of a battery and its casing constructed according to my invention. Fig. 2 is a side elevation of the same, the door of the casing being open.

The reference-numeral 1 designates a series of cups or trays tapering from the top to the bottom, so that they will nest or stack into each other. These cups or trays are made of hard rubber or other suitable non-conducting material, and any number desired or found convenient may be employed.

Secured to the upper or inner surface of each cup or tray is a positive plate 2, of lead or any suitable material, and above the same is a perforated separating-plate 3, of wood or other insulating material, and on this plate is a sheet 4 of asbestos paper. Above this asbestos sheet is a negative plate 5, of lead or any suitable material, which is preferably secured to the bottom of the pan next above it. The cups or trays contain the acidulated water-exciting fluid, and the cells thus formed are connected together in series by means of conductors 6, one end of which is soldered or otherwise secured to the negative plate of each cup or tray and then extended up the outside of the tray and then down upon the inside thereof and soldered or otherwise secured to the positive plate above. The positive plate of the lowermost cell is provided with a conductor or conductors 7, while the negative plate of the uppermost cell is provided with a conductor or conductors 8.

The number of cells may be varied as desired and the number of conductors connecting the cells may also be varied.

Located in the cups or trays below the acid-line are plugs 9, of insulating material, for preventing the cups or trays from contacting with each other, which would cause short-circuiting. By arranging these spacing devices or plugs thus below the top surface of the electrolyte I attain the important end referred to—namely, holding the trays out of contact with each other at their tops—and at the same time insure that from the surface of the electrolyte gases can readily escape, there being free passage upward for them, my construction in this respect differing from those in which the spacing or holding of one cell relative to the next was accomplished by devices practically closing the entire upper end of each cell or tray, as where the bottom corners of one were rested upon and fitted to flanges at the top corners of the next.

The battery so formed is inclosed within a casing or box 10, provided with a hinged door 12, having a lock and key, and the bottom tray is seated in a lead tray, which will catch any acid which may boil over in charging.

In a battery such as above described electrolytic action will take place in the usual manner and the current will come to the positive pole at the lower cell, and from thence pass to the positive plate on the inside thereof, thence through the perforated plate and asbestos sheet to the negative plate, and then through the conductor to the positive plate above, and so on throughout the series, constantly increasing in voltage or tension until the uppermost cell is reached, when it will leave the battery through the negative conductor.

From the above it will be seen that I dispense with the use of all connecting bolts or nuts, so that not only will a much lighter battery be produced with a given voltage, and consequently occupy much less space, but it can be readily taken apart with ease and facility. As the said cups or trays do not contact with each other and there being no liability of the acid or exciting fluid of one cell crowding into the other short-circuiting is impossible, and the upper edges are separated to such an extent as to leave openings for the escape of gases, which, if retained, seriously interfere with the electrolytic action.

In the ordinary cells having deep electrolyte masses and vertically wide plates there is variation in the specific gravity of the electrolyte liquid on vertical lines. This I avoid by subdividing the active mass into a number of shallow masses. Then I bring these close together, so as to form a continuous mass vertically, the bottom of one cell resting directly on the bottom of the one below and not upon the upper edge of the lower one in the way proposed heretofore with some of the earlier cells. By following my plan the cells can be kept out of contact at points above the electrolyte and I avoid the short-circuiting necessarily incident to those cells which contact at the tops. The cell-walls are imperforate below the top of the electrolyte, the conductor not passing, as in some cases heretofore, directly up through either wall and through the electrolyte, and hence I avoid corrosion and leakage.

The invention will be found particularly applicable to lead-zinc batteries in which amalgamated electrodes are employed, as said electrodes lying in horizontal positions there is no liability of the mercury by reason of its great specific gravity running off of the electrode, and thereby exposing the plate to the action of the electrolyte, as is the case when the said electrodes are in a vertical position.

My invention will be found particularly adapted as a motive power for street-cars.

As is well known, storage batteries as heretofore constructed have been found impracticable for running street-cars, as, owing to their great weight, the road-bed soon becomes seriously impaired and the rails destroyed.

Having thus fully described my invention, what I claim is—

1. A secondary or storage battery comprising the non-conducting cups or trays nested together but out of contact with each other, forming a vertical stack or pile, the positive and negative electrodes secured to the inner and outer sides of the bottom of said cups, the conductors connected with the negative electrodes of each cup passing up over the edge of the cups and then down to and connected with the positive electrode, substantially as described.

2. A secondary or storage battery comprising the non-conducting cups or trays superimposed upon but out of contact with each other, the positive and negative electrodes secured thereto, the perforated separating-plates, the asbestos sheet and the conductors secured to said negative electrodes, and running up the outside and then down the inside of the cup or tray above and secured to the positive electrodes thereon, substantially as described.

3. A storage battery comprising a series of cups or trays each formed of relatively thin, hard rubber or non-conducting material, and one nested within another and having its weight transmitted directly to the bottom portion of the one below it by having its bottom portion contacting directly with and resting upon the bottom portion of the one below it, there being openings between the trays for the escape of gases, substantially as set forth.

4. A storage battery comprising a series of cups or trays of relatively thin hard rubber or non-conducting material, one tray being nested within another and having its bottom portion arranged to contact directly with and rest upon the bottom of the one below and each formed with upward and outward flaring walls, in combination with electrodes arranged in pairs, the electrodes of each pair being separated by the said non-conducting tray, and all the electrodes being supported by the bottoms of the trays, substantially as set forth.

5. A storage battery comprising a series of superposed nested trays, each tray formed of relatively thin hard rubber or non-conducting material, and having its bottom portion arranged to bear directly downward upon the bottom portion of the tray below it, whereby the upper portion of each tray is relieved of supporting strain, and said upper portion having escape-passages for gases between its wall and the wall of the tray within it, in combination with electrodes arranged in couples, each electrode of each couple being insulated from the other by the non-conducting tray, and an electrical connector passing from the electrode of a couple which is below the bottom of the tray to the electrode which is above the bottom thereof, substantially as set forth.

6. A storage battery comprising a series of superposed nested trays formed of hard rubber or non-conducting material, each tray having its bottom portion arranged to bear directly downward upon the bottom portion of the tray below it, two electrodes between the bottom of each tray and the bottom of the one below it, insulating material placed between the electrodes, the upper parts of the said trays being out of contact with each other, and means at the bottom of each tray to hold it positively against lateral displacement relatively to the one below it, substantially as set forth.

7. A storage battery comprising a series of superposed nested hard-rubber or insulating trays, the portion of each tray adapted to contain the electrolyte being a continuous imperforate wall of rubber, and isolated plugs at the bottoms of the trays for holding them against lateral displacement and out of contact at their upper portions, and arranged substantially as set forth to permit the free escape and upward passage of gases, substantially as set forth.

8. A storage battery comprising a series of superposed hard-rubber or insulating trays with flaring walls, one tray being nested within another, means for supporting the tray vertically, which engage directly with its bottom portion, means engaging with the bottom portion of each tray to prevent its lateral displacement and keeping the trays out of contact with each other, a pair of electrodes for each tray, one electrode being above the bottom thereof and the other below said bottom, and a conductor connecting said electrodes, substantially as set forth.

9. A storage battery comprising a series of superposed hard-rubber or insulating trays, resting one upon another, a couple of electrodes for each tray, one electrode of the couple being above the bottom of the tray and one below it, a conductor connecting said electrodes, each tray being adapted to contain an electrolyte, spacing devices, below the upper part of that portion of the tray adapted to contain the electrolyte, for holding the trays laterally in proper position, and said trays being out of contact with each other above that portion adapted to contain the electrolyte material, whereby short-circuiting is prevented, substantially as set forth.

10. A storage battery comprising a series of superposed nested hard-rubber or insulating trays, each having a body of electrolyte material and each providing around the electrolyte body a continuous wall of rubber imperforate below the upper part of that portion of the tray adapted to contain the electrolyte, the bottom portion of each tray bearing directly downward upon the bottom of the tray below it, a couple of electrodes for each tray, and a conductor connecting said electrodes and passing from the outside to the inside of the tray at a point above the surface of the electrolyte, substantially as set forth.

In testimony whereof I affix my signature in presence of two witnesses.

RALPH ASHLEY.

Witnesses:

FRANCIS A. POCOCK,
ANNIE ASHLEY.